United States Patent
Ahilan

(10) Patent No.: US 11,518,887 B2
(45) Date of Patent: Dec. 6, 2022

(54) GROWING MEDIUM AND METHOD OF MANUFACTURING

(71) Applicant: Fibredust, LLC, Cromwell, CT (US)

(72) Inventor: Sam Ahilan, Glastonbury, CT (US)

( * ) Notice: Subject to any disclaimer, the term of this patent is extended or adjusted under 35 U.S.C. 154(b) by 155 days.

(21) Appl. No.: 17/174,414

(22) Filed: Feb. 12, 2021

(65) Prior Publication Data

US 2021/0163748 A1    Jun. 3, 2021

Related U.S. Application Data

(63) Continuation-in-part of application No. 16/894,861, filed on Jun. 7, 2020, now Pat. No. 10,945,386.

(60) Provisional application No. 62/859,001, filed on Jun. 8, 2019.

(51) Int. Cl.
*A01G 24/23* (2018.01)
*C08L 97/02* (2006.01)
*A01G 24/25* (2018.01)

(52) U.S. Cl.
CPC .............. *C08L 97/02* (2013.01); *A01G 24/23* (2018.02); *A01G 24/25* (2018.02)

(58) Field of Classification Search
CPC ........ A01G 24/00; A01G 24/20; A01G 24/22; A01G 24/23; A01G 24/25; C08L 97/02
See application file for complete search history.

(56) References Cited

U.S. PATENT DOCUMENTS

| 6,408,568 | B1* | 6/2002 | Kusey | A01G 24/00 47/9 |
| 2009/0253576 | A1* | 10/2009 | Ikin | C05F 11/00 504/101 |
| 2019/0337865 | A1* | 11/2019 | Wasko | C05D 9/00 |
| 2019/0364751 | A1* | 12/2019 | Reiersen | A01G 24/15 |
| 2020/0008372 | A1* | 1/2020 | Backfolk | C03C 25/47 |

FOREIGN PATENT DOCUMENTS

WO    WO-2009058869 A1 *  5/2009  .............. C05F 11/00

* cited by examiner

*Primary Examiner* — Kristen C Hayes
(74) *Attorney, Agent, or Firm* — Kevin Keener; Stephen Presutti

(57) ABSTRACT

According to at least one embodiment, a growing medium and method of making said growing medium is shown and described. This medium may include at least a first and second component such that at least one of the first or second component is coconut coir and the other of the at least first or second component is a wood fiber. In one embodiment, the at least first and second component are combined and then compressed via heat and pressure resulting in a finished medium for an end user.

18 Claims, 5 Drawing Sheets

| | 065WB | 090WB | 160WB | 365WB | 510WB |
|---|---|---|---|---|---|
| Total Porosity | 93-97% | 93-96% | 96-99% | 96-99% | 95-99% |
| Container Capacity (WHC) | 49-55% | 41-47% | 42-49% | 35-42% | 27-35% |
| Air Pore Space | 39-47% | 47-55% | 48-55% | 58-63% | 60-69% |

Compacted Bulk Density: 18.5 lbs./ft.³ +/- 1.5 lbs./ft.³
(296 Kg/m³ +/- 24 Kg/m³)

Loose Bulk Density: 1.4 lbs./ft.³ +/- 0.2 lbs./ft.³
(22 Kg/m³ +/- 3 Kg/m³)

FIG.2

GROWING MEDIUM AND METHOD OF MANUFACTURING

CROSS-REFERENCE TO RELATED APPLICATION

This application is a continuation-in-part of U.S. patent application Ser. No. 16/894,861, filed Jun. 7, 2020, which claims the benefit of U.S. Provisional Patent Application No. 62/859,001 filed Jun. 8, 2019, each of which is incorporated by reference herein in its entirety.

FIELD OF THE INVENTION

The invention relates to a media, and more particularly, to a growing media for plant growth having two different materials or components, one of which is coconut coir. The invention also relates to a method of constructing a finished product which may be combined with other components and compressed into any desired finished shape desired in the market.

BACKGROUND OF INVENTION

Growing media are known as different types of materials or compositions which support plant growth and can take either a solid or liquid form. Growing media can be constructed using different types of materials or components which can be adjusted for preferred medium texture and use. End users often choose which growing media is best suited for his or her needs for a specific plant. What type of growing media is best, is often dependent on what plant the media must support. For example, it is well known that microgreens do not require many nutrients for growth. Thus, the only purpose for a growing medium for a microgreen is for support and less nutrients are required in the media.

It is important when an end user is selecting a growing medium for a particular plant that the user takes into consideration the required nutrient texture needed as well as water absorption and exuding capacity. A user often considers whether the particular growing medium is easy to handle and is completely dependent on the end user's preferences.

Coconut coir is an organic product that is very sustainable and thus may be a desirable element in a growing medium. Coconut coir is a type of fiber that is forced from the tough, dense husk inside coconuts. It is composed of everything in between the shell and the outer coating of the coconut seed. In India, for instance, more than 7.5 million tons of coconut coir are produced annually. Coconut coir can provide a water-based, nutrient-rich solution and may, if desired, replace soil, as the source of nutrients for gardening uses. It can also be used as a mulching and soil treatment medium.

Wood fiber is made from parts of a tree that are broken into fragments or pieces and may also be utilized as a growing medium. Wood fiber is normally found as strands of wood that can be combined together for utilization. The wood fiber may be formed as curling strands of wood or as wood chips. Wood fiber could include any part of a tree trunk, such as bark, cambium, sapwood, heartwood, or pith.

Coconut coir when used solely as a growing medium has benefits but also limitations. The small particle size of the coconut coir means that more particles are required for a desired amount of media, and thus a larger volume of coconut coir. Furthermore, coconut coir without the addition of hydroponic nutrients is somewhat inert. This issue is further compounded with the naturally high salt levels in coco coir that can destroy flora, herbage, and verdure. Lastly, after refinement, coconut coir is typically shipped in dry, compressed bricks requiring rehydration by the user. This adds significant labor, time, and commitment when looking at coconut coir as a growing medium.

Wood fiber as a growing medium also has its own limitations. While wood fiber provides very good structural strength and size, it is limited in that it does not provide as fine of a material as may be desired. Furthermore, wood fibers pull needed nitrogen from the soil. Wood fibers also decompose in the soil thus preventing the soil's ability to aerate. What is currently needed in the marketplace and what is provided by the present invention, is a growing medium having at least two components in which one component may be a coconut coir material and the second component may be a wood fiber material which when utilized, provides the benefits of both materials without incorporating the weaknesses of each. A benefit of the present invention is to provide for a multi-use medium for various forms of flora, vegetation, and plants.

SUMMARY OF THE INVENTION

The subject matter of the present invention in one embodiment provides for a combination of at least a first or second component resulting in a finished medium. In one embodiment presently set forth, a first component is a given percentage of coconut coir and a second component is a type of wood fiber material resulting in a finished product for growth purposes.

In one embodiment of the present invention a mixture of more than one component is provided that can be conveniently formulated in variable quantities that is stable during storage and shipping.

The present invention provides for different methods of constructing the finished medium presently set forth. For instance, in one embodiment of the present invention, a mixture of at least two different components are provided such that at least one of the components is coconut coir and the mixture is treated with both heat and pressure, simultaneously or substantially simultaneously, to result in a finalized medium for use.

The present invention sets forth a method for making a growing medium for plant life by providing a first component and a second component such that said first component is coconut coir and said second component is wood fiber. Next, said first component is broken into a plurality of first fragments such that each of said first fragments of said first component has a particle size, and, optionally, a pH value that does not exceed 6.8 and a pH of a totality of all the fragments is not less than 5.5. The second component is dried and broken into a plurality of second fragments as well, and, optionally, said plurality of said second fragments have a pH of no less than 4.1 and no greater than 4.9. The first and second component are combined, and compressed into a shape and size using heat and pressure simultaneously or substantially simultaneously. In one embodiment, first component has an electrical conductivity (EC) value less than 0.800 S/m.

In one embodiment of the present invention, the method further comprised confirming said coconut coir has a specific moisture content value and said specific moisture content value is less than twenty (20) percent, and a mass ratio of the said first component to said second component is 20/80 percent. The method of the present invention may also include the addition of one or more additives to said second component.

The second component for the method may be selected from a group consisting of fibers from hardwood trees and fibers from softwood trees, and the first component and said second component may further be mixed with at least one sterilized stirring device. It is also contemplated, that the growing medium, after compressing, may be compressed in a sterile container such that the container may be vacuum sealed. The growing medium, alternatively, may be also be placed into a compressible repository after compressing such that the compressible repository is sterile and can withstand a set amount of pressure.

The method presently set forth also contemplates providing at least a third component such that the third component is an activated carbon component.

In an alternative method of the present invention, a method for making a growing medium, is set forth comprising the steps of: providing at least a first and second component; processing coconut coir into a plurality of fragments; adding a plurality of wood fibers to the coconut coir; combining the coconut coir and wood fibers; and compressing the coconut coir and wood fibers into a shape and size using a hydraulic compressor such that the medium is first compressed to at least 90 metric tons per square meter (MT) and the medium is then compressed to greater than 90 metric tons per square meter (MT). It is contemplated that after compressing the medium, the physical properties of the medium may be tested and then each of said physical properties are verified with a variance of a set of preferred values. The set of preferred values may comprise a mixture in the ratio of 50/50 or 80/20 wood fiber to coconut coir, or a mixture comprising from 50% to 80% wood fiber by mass, or a mixture comprising from 20% to 50% coconut coir by mass, or less than 20% moisture by mass, or; optionally, an acidic pH level. It is also contemplated that activated carbon may be added prior to combining the wood fiber and the coconut coir.

In another embodiment of the present invention, a growing medium is set forth comprising at least a first and second component such that at least one of either the first or the second component is coconut coir, optionally having a pH not less than 5.5, and the other component is recyclable; at least a third component such that the third component is activated carbon; and the growing medium is a compressed shape compressed at different rates. In one embodiment, the second component is a wood fiber, and the ratio of the at least first component to the at least second component is a 20/80 ratio.

Additional objects and features of the invention will be apparent to those skilled in the art from the following detailed description and appended claims.

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

FIG. 2 illustrates a table describing the physical properties of Wood Fibre (Fiber);

DETAILED DESCRIPTION

Figure 1A:
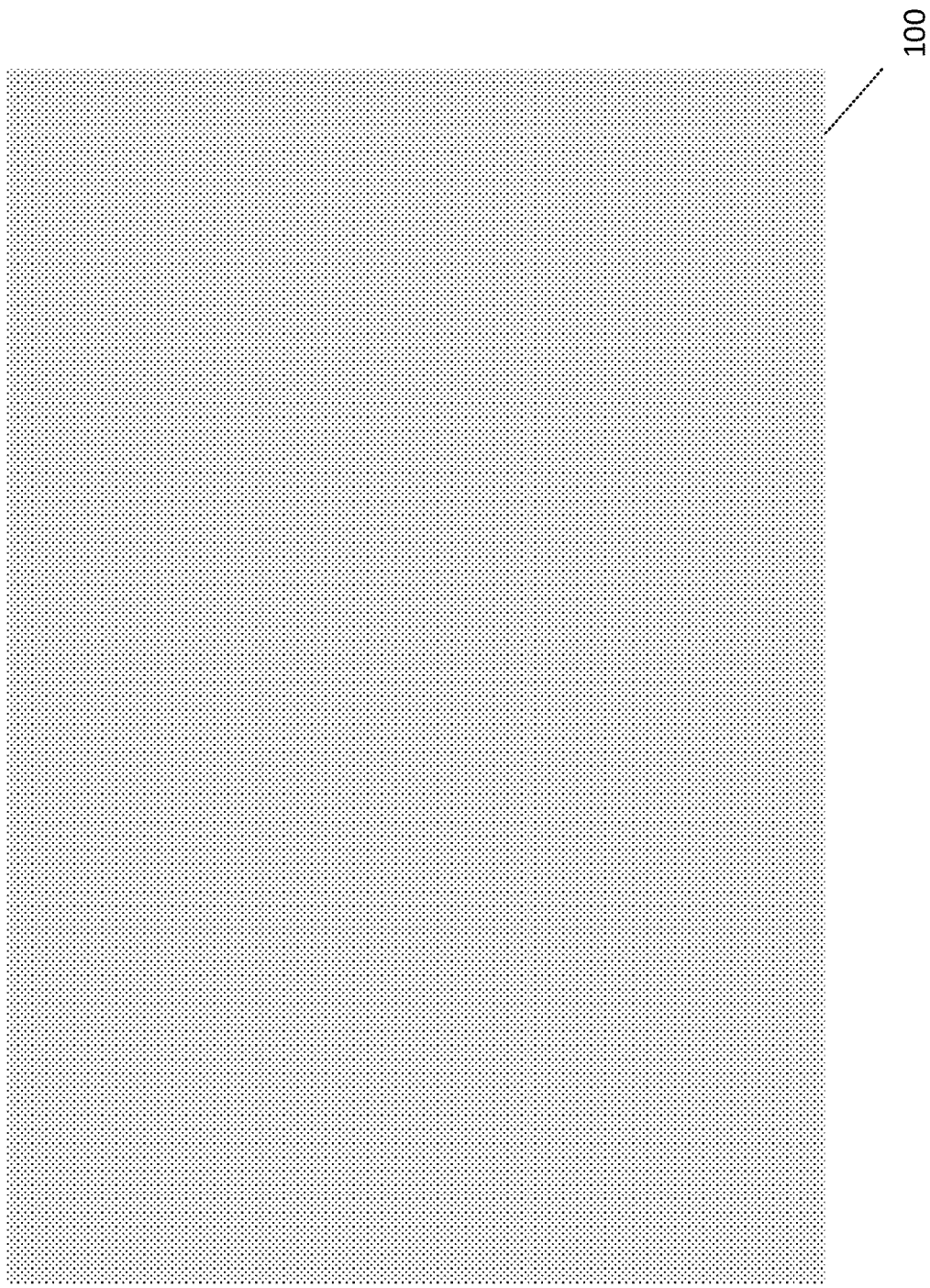
FIG. 1A illustrates an overall depiction of the growing medium of the present invention.

The claimed subject matter is now described. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

The present invention is directed toward a medium comprising a combination of at least two components. In one embodiment presently set forth, the medium comprises at least a first and a second component in which the first and second components are in unequal percentages throughout the overall medium. In other embodiments the components are in equal percentages. It is also contemplated that the at least the first and second components may be present in the finished product in equal amounts by weight. The varying percentages utilized of a component would depend on the desired qualities of growing medium by an end user of the finished medium. It is important to note that the present invention is not limited to a certain percentage of either the first or second component and the present invention is not limited to a certain number of components that make up the totality of the medium. For instance, the present invention contemplates that the growing medium may comprise a plurality of components and one of the components is coconut coir. In another embodiment, at least one component utilized in the finished growing medium is a sustainable component that is recyclable.

The preferred embodiment of the invention pertains to a growing medium utilized for growing plants and a method of manufacturing and use of the growing medium. The growing medium is comprised of at least two components. A first component is formed from coconut coir. The coconut coir may be obtained from coco peat (pith inside the coconut husk), coco fiber, or coco chips (chunks of coconut husk). The coconut coir may be treated or buffered with a calcium nitrate solution to create a treated or buffered coir. The second component utilized is wood fiber which is obtained from either a hard wood or a soft wood. In some embodiments a third component of activated carbon may be added to the mixture.

In one embodiment presently contemplated, at least one of the components in the growth medium is a wood fiber (also known as fibre in the art) having a range between ten percent to fifty percent of the entire medium. The second component may be coconut coir, thus if ten percent of wood fiber is used then ninety percent of coconut coir is used. If fifty percent of wood fiber is used, then fifty percent of coconut coir is used. In a preferred embodiment the growing medium contains between ten percent and thirty percent of wood fiber. In this particular range, the combined wood fiber and coconut coir have the ability to optimize the water retention and air porosity of the medium. It is important to note that either a first, second or any number of components may be coconut coir in the present invention.

In one embodiment presently contemplated, the overall growing medium comprises almost completely coconut coir as the first or second component and the other component or components occupy a small percentage of the overall totality of the growing medium.

Figure 1B:
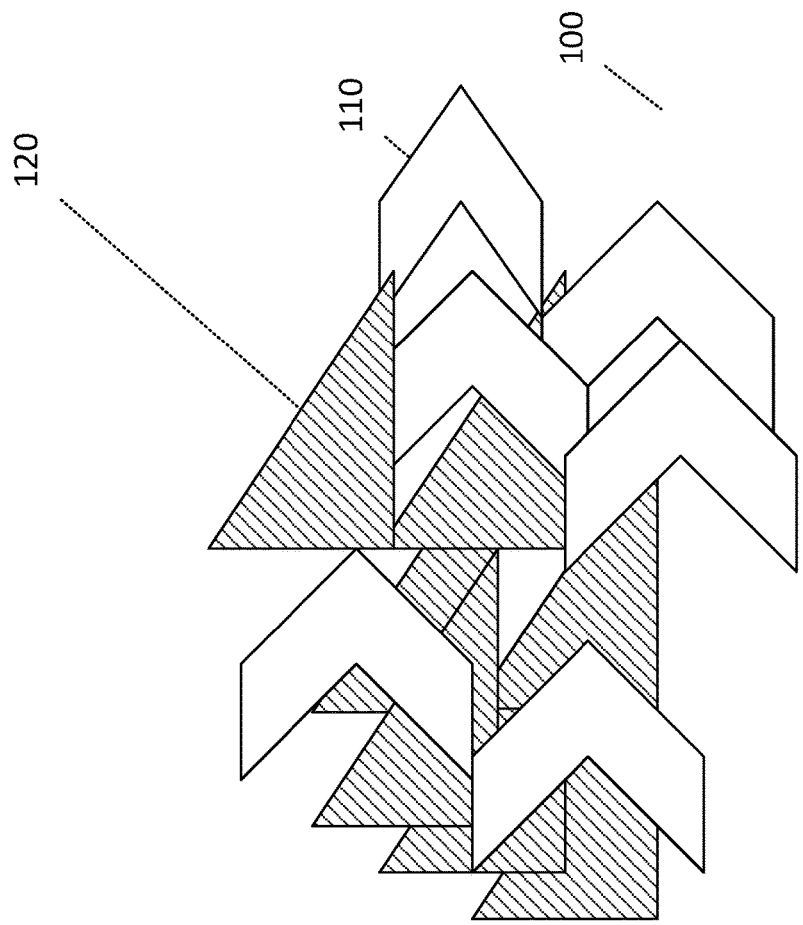
FIG. 1B illustrates a magnified depiction of the growing medium of the present invention.

Attention is directed to FIG. 1A of the present invention which illustrates the finished product—the growing medium 100 available for an end user. FIG. 1B illustrates a magnified view of uncompressed growing medium having at least a first component 110 and second component 120.

To make a growing medium presently contemplated, an end user must first select what type of growing medium is best suited for his or her needs. From there, at least a medium having at least a first and second component is selected. In one embodiment presently contemplated either the first or second component is coconut coir. A benefit of utilizing coconut coir in an overall medium is that it is known for its water retention properties, but also allows for proper drainage and prevents water logging of plant roots helping to prevent rot. Coconut coir also contains helpful micronutrients which aid in plant growth such as magnesium and calcium.

If coconut coir is utilized as a component of the overall medium, the coconut coir preferably is properly prepared prior to going further in the manufacturing process. For instance, the coconut coir is processed by chopping, cutting, pulling and/or separating into a plurality of smaller components or pieces or broken down into "dust" which aids in the ease of processing. When the coconut coir is broken down into "dust", in one embodiment it has a bulk density of at least $0.074$ g cm$^3$, a particle density of at least $0.758$ g cm$^3$, a total pore space of at least 96.264% of the volume, and a shrinkage percentage volume of at least 11.206%. The plurality of smaller components of coconut coir may be washed and dried to remove any undesired contaminants. Coconut coir can be washed and dried by any means known in the art. In one embodiment, the coconut coir may be washed in "tidal waves" and if done in these waves, the coir will need to be flushed out. The coconut coir is then removed from a water bath and may be dried for almost over a year. After being completely dried the coir can be organized into bales. Processing of coconut coir may also require buffering by means known in the art to introduce certain ions as coconut coir if un-buffered may be too high in in sodium and potassium and too low in other nutrients such as calcium and magnesium. For instance, buffering may be accomplished by adding certain supplements having certain desirable ions (Ca+2 and MG+2) to remove natural potassium and sodium ions. Coconut coir also has an electrical conductivity of 0.800 S/m or less in one embodiment. Electrical conductance is the measurement of the coconut coir's ability to conduct an electrical current, and in one embodiment is calculated utilizing a formula of Conductivity=1/Electrical Resistivity SI unit. A conductivity meter along with a probe are often used to provide an electrical voltage to a solution or item, such as coconut coir, being measured for electrical conductivity.

The present invention also contemplates that the coconut coir may be steam sanitized as well. The individual particle size of the coconut coir is not critical and may be any size presently contemplated in the art. For example, in one embodiment, the coconut coir ranges from 1 mm to 12 mm in size.

In one embodiment of the present invention, if coconut coir is utilized as a component within the overall finished growing medium, it has a specific moisture value and a moisture content of the fragments of the coconut coir when processed is less than twenty (20) percent. Said moisture content of a substance or article can be determined utilizing a moisture analyzers or balancers known in the art. Moisture content can also be determined, in one embodiment, by drying said sample in an oven or other type of dryer. The sample is then placed into a container and weighed. The container weight is subtracted from the total of the container weight+sample. This can be utilized in the following formula to determine a moisture content measurement for a sample: The weight of water being initial weight minus oven dry weight. mc=(initial wt−oven dry wt)/oven dry wt*100.

One of the components utilized in the overall growth medium may be a type of fiber. For instance, the fiber may be a wood fiber obtained from any type of wood during the milling process. FIG. 2 illustrates a plurality of wood fiber physical properties that make it desirable to add to a growth medium. For instance, the wood fiber may have a total porosity of 93-97% at 065WB (Weber), 93-96% at 090WB, 96-99% at 160WB, 96-99% at 363WB, and 95-99% at 510WB. At 065WB, wood fiber may have a container capacity (WHC) of 49-55% and an air pore space of 39-47%. At 090WB, wood fiber may have a container capacity (WHC) of 41-47% and an air pore space of 47-55%. At 160WB, the wood fiber may have a container capacity (WHC) of 42-49% and a compacted bulk density of 48-55%. At 363WB, the wood fiber may have a container capacity WHC of 35-42% and a compacted bulk density of 58-63%. Lastly, at 510WB, the wood fiber may have a container capacity (WHC) of 27-35%, and a compacted bulk density of 60-69%.

The wood fibers presently used may come from hard wood or soft wood and may be completely dried and/or combined with additives prior to use in the method presently contemplated. Such additives may include grow rock, rockwool, oasis cubes, blood meal, vermiculite and other additives or nutrients can be added to the wood fiber. In one embodiment the wood fiber is obtained from pine trees. The wood fiber may also be prepared for utilization by breaking the wood fiber into further components or pieces and may be treated by chemicals, washing, or any other standard processing. The size of the wood fiber particles may be any size and shape contemplated by the art. In the preferred embodiment the wood fiber particles range in size from 1 cm to 5 cm.

It is important to note that while the present specification discusses that one of the components that comprises the overall growth medium is a wood fiber (also referred to as fibre), it is also contemplated that one of the components can be another type of fiber beneficial for growth mediums. For instance, in one embodiment, either the first or second component may be a bacterial growth component, clay, shale, lava rock, pine shavings, composted or recycled components, water absorbing crystals etc.

The present invention also contemplates that in one embodiment, the medium may comprise at least three components such that the components comprises at least coconut coir, wood fiber and an activated carbon. The activated carbon may be a very low percentage of the overall medium such as 1% to 5%. In other embodiments the activated carbon may be as high as 10% by weight of the growing medium. The utilization of activated carbon in the overall growth medium serves a purification purpose and ensures that the desired plant is obtaining all the required essential nutrients. In another embodiment presently contemplated, the medium comprises at least two components such that at least one of the components is activated carbon. The other of the at least two components may be a wood fiber or coconut coir or a mixture of a percentage of both a wood fiber and coconut coir.

Activated carbon is constructed using charcoal. Charcoal itself is produced in the absence of oxygen whereas activated carbon is produced by treating charcoal with oxygen. In one embodiment, the activated carbon presently contemplated may be made by providing charcoal and then powdering the charcoal by smashing the charcoal with an instrument such as a hammer. A solution may be made using calcium along with chloride. In one embodiment, the solution is 25% calcium chloride such that 100 grams of calcium chloride is dissolved in 300 mL of water. A paste is then made by slowly adding the calcium chloride mixture to the powdered charcoal. In the preferred embodiment, the activated carbon is formed through physical activation rather than chemical activation. In the physical activation process the carbon used to create the activated carbon is pyrolyzed at a temperature above 600 degrees Celsius in an inert gas or is exposed to an oxidizing atmosphere at a temperature greater than 250 degrees Celsius.

Figure 3:
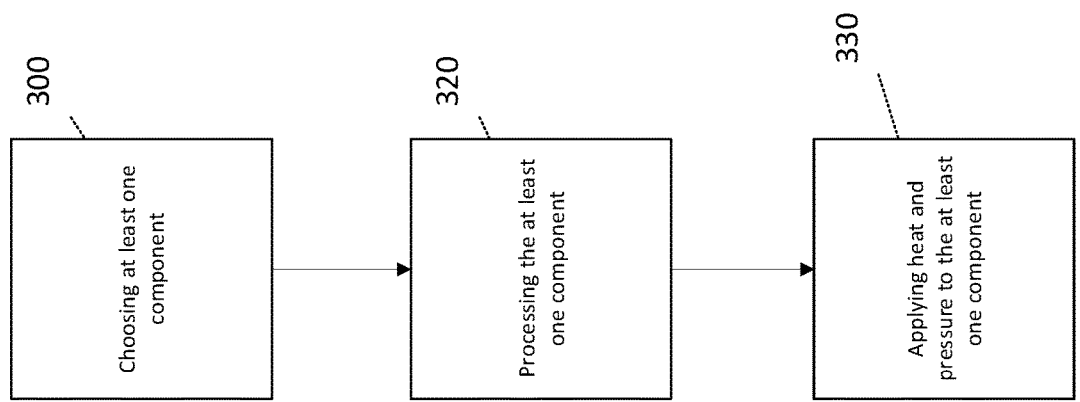
FIG. 3 illustrates one generalized method of making the growing medium of the present invention.

FIG. 3 illustrates a simplistic overall refining process of using both a first and second component to arrive at a finished product ready for use in the market. First, at least one component is chosen 300 for use based upon the properties desired in a growth medium and what is best suited for plant growth. In one embodiment presently contemplated by the present invention, at least two components are chosen in order to construct a growing medium. If this is the case, then both the first and second component may be processed based on their processing requirements and if two different components are chosen, they may have different properties from one another. Then heat 310 and pressure 330 are applied, simultaneously or substantially simultaneously, during refining and from that refinement a finished product 340 is developed and ready for use. In one embodiment presently contemplated, first heat 310 is applied and then less than one minute later pressure 330 is applied. It is also contemplated that first pressure 300 is applied and then heat 310 less than a minute later.

Figure 4:
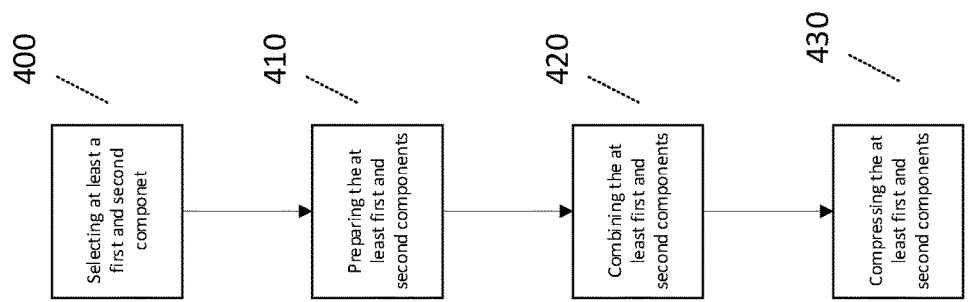
FIG. 4 illustrates a block diagram of a method of making the growing medium of the present invention.

FIG. 4 shows a more nuanced method for making the growth medium of the present invention. Once a user has selected a desired growing medium most beneficial to the living article at issue and the component(s) that make up the desired growing medium are properly selected 400 and prepared 410. For instance, in one embodiment, the first component 110 is processed into a plurality of fragments such that each fragment of the first component 110 has a particle size, optionally, a pH value that does not exceed 6.8 and the pH of a totality of all the fragments is not less than 5.5. The second component 120 may also need to be processed in order to properly be utilized in the finished growing medium and the present invention contemplates, optionally, that the least second component 120 has a pH of no less than 4.1 and no greater than 4.9. In one embodiment, the at least first component 110 is coconut coir and the at least second component 120 is a type of wood fiber. The present invention contemplates that there may be numerous other types of components within the finished growing medium, but is not required for the present invention.

The component(s) are combined to promote a relatively uniform mixture of the growing medium. It is contemplated that a mass ratio of the at least first component to the at least second component is 20/80 percent if more than one component is utilized. In one embodiment, the components, when more than one is utilized, may be mixed together 420. The components may be mixed together by any means known in the art such as, but not limited to, stirring and may be accomplished by a sterile device or stirrer. Next, the growing medium is compressed either simultaneously or substantially simultaneously. In one embodiment, the intermediate medium is compressed 430 by a hydraulic press to form varying sizes and shapes of the compressed medium. The growing medium may be compressed into bricks, blocks, discs, slabs, or any other desired shape. The compression may be at any amount of pressure or may be implemented by any means known in the art. The amount of pressure may be in the range of 90-110 metric tons per square meter (MT), and may vary depending on the form of growing medium desired. The growing medium of the present invention may be compressed into various shapes and sizes which aids in the ease of utilization by an end user. A compressed version of a desired medium aids in the transportation of the growing medium, but it also contemplated that the finished product may be in "loose" form and compression is not needed. Once transported to its desired location, water or any other solvent can be added to the compressed medium. For instance, in one embodiment, for 5 kg shapes and bricks, a pressure of 125 to 160 metric tons per square meter (MT) is utilized. For grow bags and discs, a pressure of 170 to 200 metric tons per square meter (MT) is used. In other embodiments the growing medium where the medium is not compressed it can be bagged after mixing.

Either the compressed growing medium or uncompressed, loose growing medium may be placed into a sterilized environment such as any container known in the art in order to be transported to a location for use. For instance, the container may be a bag made out of a polymer such as plastic that may be vacuum sealed partially or completely. A seal of a container may be an airtight seal. In one embodiment, the growing medium is placed into a compressible repository. The compressible repository may be sterile and can withstand a set amount of pressure known in the art.

The present invention contemplates that the selection of an appropriate growth medium and the election of the component(s) that make up said medium may be done manually by a user or may be a computerized selection process.

The present invention also contemplates a different method for making a growing medium in which at least a first 110 and second 120 component are provided and the at least first 110 component is processed into a plurality of fragments. The second 120 component may also be processed by cutting, separating, and/or breaking apart the second component 120. The first 110 and second 120 component are then combined and compressed using a hydraulic compressor at various pressures such that the medium is first compressed at at least 90 metric tons per square meter (MT) and the medium is then compressed at greater than 90 metric tons per square meter (MT). The hydraulic compressor may be any type of compressor known in the art that can convert hydraulic power into mechanical power allowing for said equipment with any type of existing hydraulics, to simultaneously or substantially simultaneously, utilize hydraulic and pneumatic power.

The method may also comprise after compressing, testing a plurality of physical properties of a portion of the medium and verifying that each said plurality of physical properties are within a variance of a set of preferred values. In one embodiment, the set of preferred values comprise a mixture in the ratio of 50/50 or 80/20 wood fiber to coconut coir, an acidic pH level and an overall less than 20% moisture content.

The invention is also directed toward a growing mixture containing a percent by weight of coconut coir and a percent by weight of wood fiber. In other embodiments the growing mixture contains a percent by weight of activated carbon. In the preferred embodiment the growing mixture contains between 10% to 90% by weight of coconut coir and the corresponding amount by weight of wood fiber so that the entire mixture is 100% a combination of coconut coir and wood fiber. In other embodiments the mixture contains up to 10% by weight of activated carbon. The remaining 90% is formed by the mixture of coconut coir and wood fiber. This 90% mixture itself may contain between 10% to 90% by weight of coconut choir and the corresponding amount by weight of wood fiber (e.g. 10% coconut coir and 90% wood fiber; 90% coconut coir and 10% wood fiber).

The invention is directed toward a growing medium comprising a combination of wood fiber and coconut coir. The growing medium may contain any amount percentage of wood fiber and any percentage of coconut coir. The varying percentages utilized would depend on the desired qualities of growing medium. The preferred range of wood fiber utilized is best between ten percent to fifty percent. If ten percent of wood fiber is used then ninety percent of coconut coir is used. If fifty percent of wood fiber is used then fifty percent of coconut coir is used. In the preferred embodiment the growing medium contains between ten percent and thirty percent of wood fiber. In this range, the combined wood fiber and coconut coir optimizes the water retention and air porosity of the medium.

To make the growing medium the coconut coir is chopped up into small pieces. The coconut coir is washed and dried to remove any undesired contaminants. The coconut choir may be steam sanitized as well. After processing, the individual particle size of the coconut coir may be any size. In the preferred embodiment the coconut coir ranges from 1 mm to 12 mm in size. The wood fiber may be obtained from any type of wood during the milling process. The wood fibers may come from hard wood or soft wood. In the preferred embodiment the wood fiber is obtained from pine trees. The wood fiber may be treated by chemicals, washing, or any other standard processing. The size of the wood fiber particles may be any size and shape. In the preferred embodiment the wood fiber particles range in size from 1 cm to 5 cm.

The growing medium may also contain separate percentages of specific sizes of particles of coconut coir and specific size ranges of wood fiber. The sizes may also be separated into small ranges of sizes and the growing medium may contain specific percentages of each size range. The different sizes or ranges can be separated by sifting or filtering the wood fiber and coconut coir. For instance, the final growing medium may contain 20 to 25% by weight coconut coir in the range of 1 mm to 5 mm, 25 to 30% by weight coconut coir in the range of 6 mm to 12 mm, 30 to 40% by weight wood fiber in the range of 1 cm to 2 cm, and 0% to 5% wood fiber by weight in the range of 3 cm to 5 cm.

Once the desired amounts of coconut coir and wood fiber are selected, the materials are mixed together to promote a relatively uniform mixture of the growing medium. The growing medium is then compressed by a hydraulic press to form varying sizes and shapes of the compressed medium. The compression may be at any amount of pressure or may be implemented by any means. The amount of pressure may be in the range of 90-110 metric tons per square meter (MT). The amount of pressure used may vary depending on the form that growing medium is formed. For instance, for 5 kg shapes and bricks, a pressure of 125 to 160 metric tons per square meter (MT) is utilized. For grow bags and discs, a pressure of 170 to 200 metric tons per square meter (MT) is used. The growing medium may be compressed into bricks blocks, discs, slabs, or any other desired shape. In other embodiments the growing medium is not compressed but is bagged after mixing.

To utilize the mixture, a user obtains the compressed block of the mixture of growing media. The user opens the bag of compressed growing medium. The user then places the block of growing medium in a desired container which will house a plat or seed for growing. The user may break off a certain predetermined section of the growing block so that the user only uses a portion of the growing medium. The user then rehydrates the growing medium with a predetermined amount of water. When rehydrated the growing medium expands. The user may select all or a portion of the expanded growing medium. The user then places a small plant or a seed within the expanded growing medium.

In other embodiments of the invention the user may place the growing medium in a prepared section of earth such as in a garden bed. The user may remove a portion of rocks, dirt, or soil from a chosen area and place the compressed or expanded growing medium in the chosen area.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for making a growing medium for plant life, comprising the steps of:

providing a first component and a second component wherein first component is coconut coir and said second component is wood fiber;

breaking said first component into a plurality of first fragments such that each of said first fragments of said first component has a particle size;

drying said second component and breaking the second component into a plurality of second fragments;

combining said first component and said second component; and compressing said first component and said second component into a shape and size using pressure.

2. The method of claim 1 wherein compressing said first component and said second component into a shape and size using pressure further comprises using heat and wherein the heat and pressure are applied substantially simultaneously.

3. The method of claim 1 further comprising confirming said first component has an electrical conductivity (EC) value less than 0.800 S/m.

4. The method of claim 1 further comprising confirming said coconut coir has a specific moisture content value, wherein said specific moisture content value is less than twenty (20) percent.

5. The method of claim 1 further comprising confirming a mass ratio of the said first component to said second component is a ratio ranging between 80/20 and 50/50.

6. The method of claim 1 further comprising adding one or more additives to said second component.

7. The method of claim 1, wherein said second component is selected from a group consisting of fibers from hardwood trees and fibers from softwood trees.

8. The method of claim 1, wherein combining said first component and said second component further comprises mixing with at least one stirring device.

9. The method of claim 1 further comprising placing said growing medium after compressing in a container.

10. The method of claim 9, further comprising vacuum sealing said container.

11. The method of claim 1, further comprising placing said growing medium into a compressible repository after compressing, wherein said compressible repository is sterile and can withstand a set amount of pressure not less than 90 MT.

12. The method of claim 1, wherein the method further comprises providing at least a third component prior to processing the first and the second components such that the third component is an activated carbon component.

13. The method of claim 1, wherein each of said first fragments of said first component has a pH value that does not exceed 6.8.

14. The method of claim 13 wherein said plurality of said second fragments has a pH of no less than 4.1.

15. A method for making a growing medium, comprising the steps of:

providing at least a first component comprising coconut coir;

providing a second component comprising wood fibers;

processing the coconut coir into a plurality of fragments;

adding a plurality of wood fibers to the coconut coir;

combining the coconut coir and wood fibers to form a growing medium;

heating the growing medium; and compressing the growing medium into a shape and size using a compressor such that the growing medium is first compressed at a pressure of at least 90 MT and the growing medium is then compressed at a pressure greater than 90 MT.

16. The method of claim 15 further comprising, after compressing the growing medium, testing a plurality of physical properties of a portion of the growing medium; and verifying that each said plurality of physical properties are each within a variance of a set of preferred values.

17. The method of claim 16, wherein the set of preferred values comprises a mixture comprising from 50% to 80% wood fiber by mass; and a mixture comprising from 20% to 50% coconut coir by mass; and less than 20% moisture by mass; and an acidic pH level.

18. The method of claim 15, further comprising adding activated carbon prior to the growing medium.

\* \* \* \* \*